Patented Apr. 3, 1945

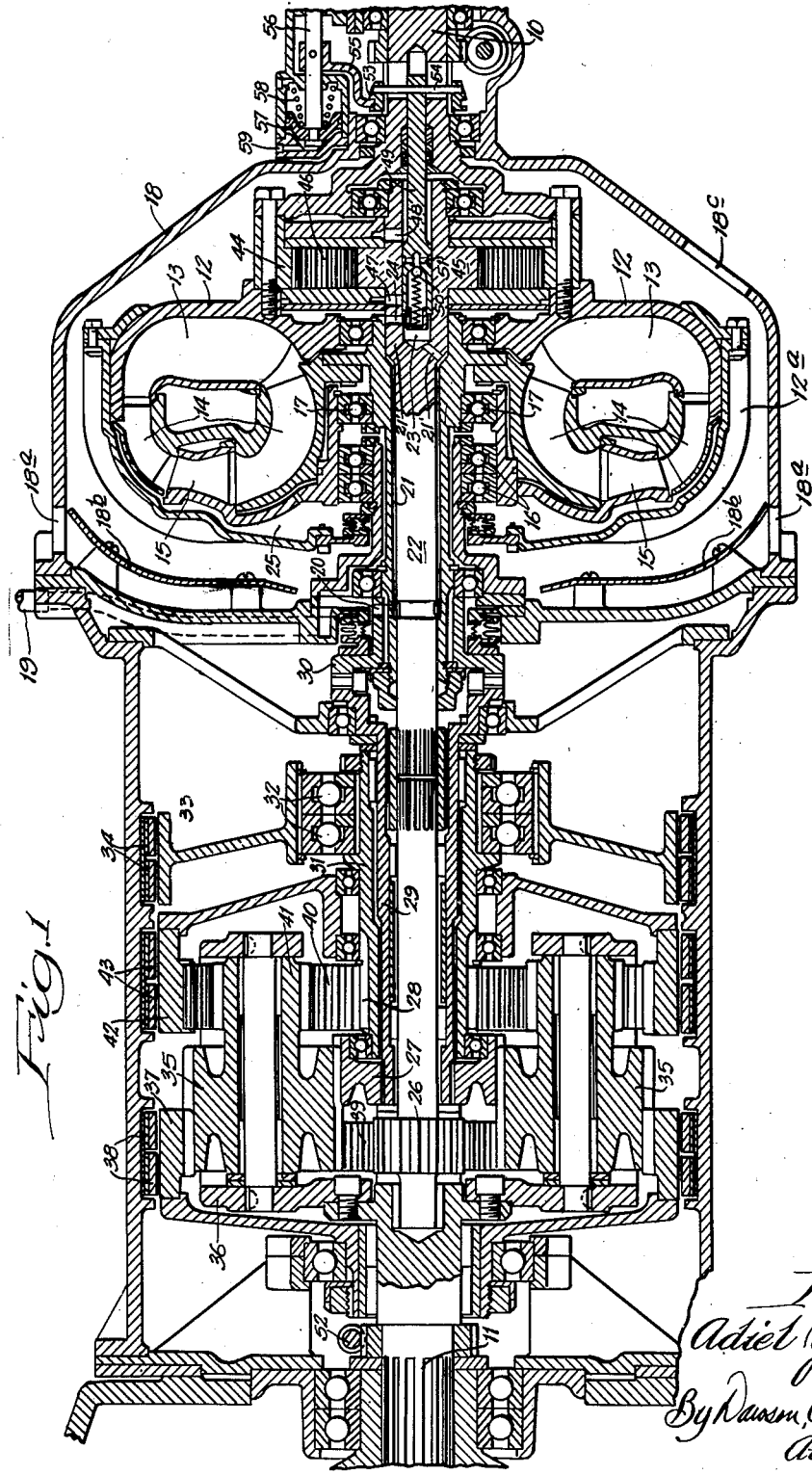

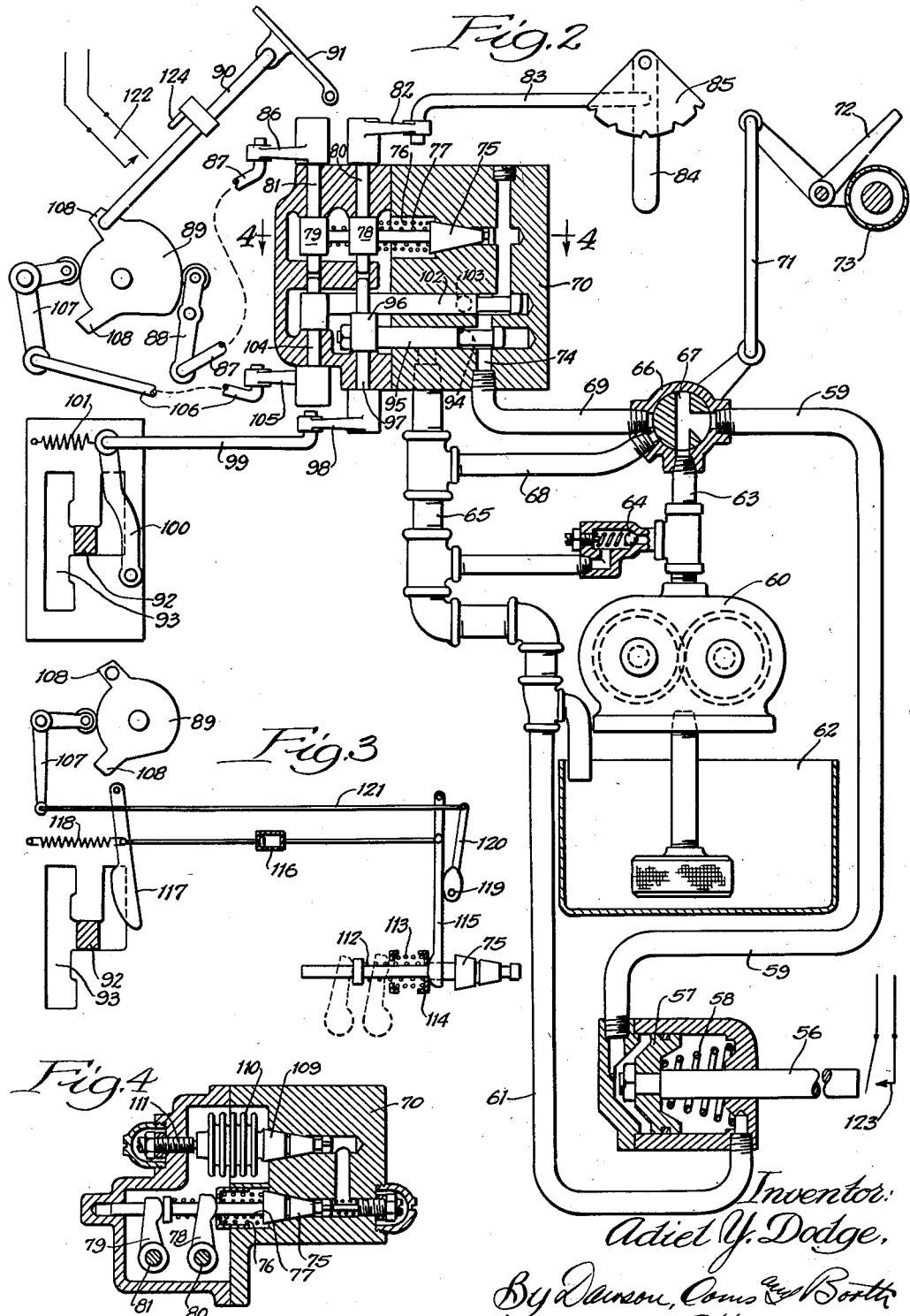

2,372,817

UNITED STATES PATENT OFFICE 2,372,817

TRANSMISSION

Adiel Y. Dodge, Rockford, Ill.

Application October 24, 1941, Serial No. 416,319

15 Claims. (Cl. 74—189.5)

This invention relates to transmissions, and more particularly to transmissions adapted for use on automotive vehicles which may be controlled semi-automatically to change the driving conditions of the vehicle.

One of the objects of the invention is to provide a transmission including a hydraulic torque transmitting unit and a gear set in which the driving conditions may be changed to obtain several forward and at least one reverse speed by means of a minimum number of simple clutches and brakes.

Another object of the invention is to provide a transmission in which the driving conditions can be changed by a simple hydraulic clutch controllable to pick up and release the load smoothly and easily at any time.

Still another object of the invention is to provide a transmission in which the ignition circuit of the driving engine is temporarily disabled during certain shifting operations to remove the load, thereby to facilitate shifting.

Another object of the invention is to provide a transmission in which driving conditions are shifted in response to transmission speed under the control of a spring loaded member, and in which the spring loading of the member can be changed at will to vary the speed at which shifting will occur. According to one feature of the invention, the spring loading may be changed manually to set the shifting speed in accordance with the desires of the operator, and may also be changed automatically through operation of the accelerator pedal or a like control member.

Another object of the invention is to provide a transmission in which shifting is effected by a fluid pump under the control of a relief valve. By changing the loading on the relief valve, the point at which shifting will occur can easily and quickly be regulated during operation.

Another object of the invention is to provide a fluid operated shifting mechanism in which variations in temperature of the operating fluid are compensated for so that the shifting mechanism will operate in the same manner at all times.

Still another object of the invention is to provide a transmission in which automatic shifting is prevented when desired. Preferably, shifting may be controlled by a lever for changing the driving range of the transmission so that it will be prevented in certain ranges. According to a further feature, shifting may be prevented when the accelerator pedal or like engine control member is in certain positions, as for example, full open.

The above and other objects and advantages of the invention will be better understood from the following description when read in connection with the accompanying drawings, in which:

Figure 1 is a longitudinal section of a transmission embodying the invention;

Figure 2 is a diagrammatic view of a control system for controlling the transmission of Figure 1;

Figure 3 is a partial diagram similar to Figure 2, illustrating an alternative construction; and Figure 4 is a partial section through the valve on the line 4—4 of Figure 2.

The transmission of Figure 1 connects an engine shaft, indicated at 10, to a driven or output shaft 11, which may be connected to the driving wheels of an automotive vehicle. The engine shaft is connected to the casing 12 of a hydraulic torque transmitting device, and carries a series of driving or impeller vanes 13. Adjacent the opposite ends of the impeller vanes 13 are arranged a series of rotor or turbine vanes 14, to be driven by fluid in a manner well understood in the art. Between the two sets of rotor vanes 14, there is arranged a set of stator vanes 15, mounted on one-way brakes 16, which will permit the stator vanes to turn forwardly, but will prevent them from turning rearwardly. Preferably, a similar one-way clutch 17 is arranged between the stator and rotor to prevent the stator from turning forwardly faster than the rotor, so that under conditions approaching one-to-one drive, the stator will act as a continuation of the rotor.

The hydraulic torque converter is enclosed in a stationary housing or casing 18, and is supplied with operating fluid through an inlet pipe 19 extending through a passage in the housing, and communicating through an opening 20 with a space 21 around a central shaft 22. The space 21 communicates through ports 21' with a valve chamber 23, and through an outlet passage 24 with the torque converter circuit. Fluid leaves the torque converter through a space between the several elements and through an annular cavity 25 in the casing 12 from which it may be recirculated through a cooling radiator or the like before being returned to the inlet pipe 19. The torque converter is cooled by air drawn in through openings 18a in the periphery of the casing and flowing inwardly behind plates 18b and then around the torque converter and out through openings 18c. Circulation of the air may be caused by vanes 12a on the casing 12.

The transmission is completed by a gear set housed in a continuation of the casing 18, and comprising three sun gears, 26, 27 and 28. The sun gear 26 is mounted on a continuation of the central shaft 22. The sun gear 27 is mounted on a sleeve 29, which is connected through a coupling 30 to the hydraulic rotor 14. The sun gear 28 is mounted on a sleeve 31, which is connected through one-way clutches 32 to a brake drum 33, adapted to be held stationary when desired by a brake band 34. The sun gear 27 meshes with an elongated planet gear 35 mounted on a carrier 36 which is connected to the driven shaft 11. The gear 35 also meshes with a ring gear 37 which is normally freely rotatable, but which may be held against rotation by a brake 38. The sun gear 26 meshes with an idler gear 39 which also meshes with the planet gear 35. A second idler 40 meshes with the sun gear 28, with a reduced extension 41 rigidly connected to the planet gear 35 and with a second ring gear 42. The ring gear 42 is normally freely rotatable, but is adapted to be held against rotation by a brake 43.

The shaft 22 is adapted to be connected to the engine shaft 10 by a clutch in order to obtain certain desirable driving connections. As shown in Figure 1, the clutch is in the form of a positive displacement type fluid pump comprising an outer gear 44 connected to the engine shaft 10, and a sun gear 45 connected to the shaft 22. The gears 44 and 45 mesh with planet gears 46, which are enclosed to form fluid passages. Fluid is adapted to be admitted to the pump through a passage 47, and to be discharged therefrom through a passage 48, both communicating with the valve chamber 23.

Operation of the pump, by which it may be permitted to run freely or may be locked to connect the shafts 10 and 22, is controlled by a valve 49, slidably mounted in the chamber 23. The valve includes a spring loaded relief valve 50 mounted in the interior thereof, and connecting its inner end with a transverse passage 51 therein. When the valve is in the position shown in Figure 1, the inlet port 47 is cut off so that no fluid is admitted to the pump, and it may run freely. When the valve is shifted to the right, the passage 51 therein communicates with the outlet passage 48 of the pump, and the inlet passage 47 opens into the valve chamber 23. At this time fluid is admitted to the pump, but its outlet is closed except for the relief afforded by the valve 50. Thus, the pump will tend to lock and will couple the engine shaft 10 to the intermediate shaft 22. The valve 49 is controlled through a mechanism to be described hereinafter, operated by a fluid pump driven by a take-off gear 52, driven by the output shaft 11.

The transmission, as described, provides several different driving conditions for a plurality of forward speeds and for at least one reverse speed. With the several brakes 34, 38 and 43, all disengaged, and with the valve 49 in the position shown in Figure 1, the transmission is in neutral position, in which no torque will be transmitted. To obtain reverse drive, the brake 43 is engaged to hold the ring gear 42 fixed. At this time, the planet gears 35 and 41 will be driven through the sun gear 27, and the hydraulic torque converter. Due to the meshing of the idler gear 40 with the planet pinion 41 and the ring gear 42, the planet carrier will be caused to rotate in a reverse direction at reduced speed. In low speed forward, the brake 38 is engaged to lock the ring gear 37, the other brakes 34 and 42 being released. The sun gear 27 is driven through the hydraulic torque converter and turns the planet gear 35, causing it to roll on the stationary ring gear 37, thereby turning the planet cage 36 and the driven shaft forward at reduced speed. Due to the inclusion of the hydraulic torque converter in both the reverse and forward low speeds, it will be noted that the transmission operates through an infinite number of torque ratios, so that these driving conditions are, in effect, variable speed and torque ranges.

In higher forward speeds, the brake 34 is engaged, the brake 38 being released. In this condition, the sun gear 28 is held stationary and the sun gear 27 is driven forward through the hydraulic torque converter. The sun gear 28 thus acts as a reaction member, and through the gear set causes the planet cage 36 and the driven shaft to turn forwardly at a torque ratio less than that obtained in low gear, as described above, but greater than unity. When the hydraulic clutch is engaged by shifting of the valve 49, the engine shaft 10 is connected to the shaft 22 and through it to the sun gear 26. At this time both sun gears 26 and 27 are driven forwardly through two paths of torque flow, and both act on the planet gear 35 to drive it and the cage 36 forwardly. In this condition, the speed and torque ratios will approach unity, as the drive through the hydraulic unit approaches the one-to-one ratio.

The valve 49 is adapted to be controlled in such a way as to shift from the intermediate forward speed drive to the high speed range by means of a fluid operated mechanism actuated by the gear pump driven through the take-off 52. As shown in Figure 1, the valve 49 is connected to a collar 53, slidable on the engine shaft 10 and connected to the valve by means of a pin 54 extending through a slot in the shaft. The collar 53 is rotatably connected to a yoke 55 carried by a rod 56, forming the piston rod to a piston 57. The piston is urged to the left, as seen in Figure 1, by a spring 58, and is adapted to be moved to the right by fluid pressure admitted through a passage 59. When the pressure admitted through passage 59 exceeds the value of the spring 58, the collar and valve will be shifted to the right to cause the fluid clutch to engage.

As best seen in Figure 2, fluid is supplied to the piston 57 by a pump 60, normally communicating with the passage 59. Any fluid escaping past the piston 57 will be returned through a pipe 61 to a sump 62, which may be the gear case of the transmission or the crank case of the engine driving shaft 10, and from which fluid is supplied to the pump 60. The outlet pipe 63 of the pump 60 communicates through a pressure relief valve 64 with a return pipe 65 leading into the sump to avoid building up dangerous pressures. The pipe 63 also communicates with the casing 66 of a valve shown as being of the plug type, having T-shaped passages 67 therein. The pipe 59 communicates with one side of the casing 66. A return pipe 68 connects the valve casing 66 to the return pipe 65, and a third pipe 69 communicates with the valve casing 66 and with a control valve, indicated generally at 70.

The valve 67 is adapted to be controlled through a linkage 71, connected to a handle 72, adapted to be mounted on the steering column of the vehicle, indicated at 73. The lever 72 forms a finger lever which may be easily thrown from one to another of its several positions by the finger of the operator.

When the valve 67 is in the position shown, the pump outlet pipe 63 is connected directly to the pipe 59, so that whenever the pump is driven fast enough to build up a pressure sufficient to overcome the spring 58, the rod 56 and the valve 49 will be shifted. If it is not desired to shift the valve 49, the valve 67 may be turned through approximately sixty degrees (60°), so that the T-passage will directly connect the pipes 63 and 68. At this time, all fluid discharged by the pump will be returned directly through the pipes 68 and 65 to the sump, so that no pressure will be conducted to the piston 57. If the valve is turned through approximately ninety degrees (90°) from the position shown, it will connect the pipe 63 with both pipes 59 and 69. This is the automatic position in which shifting of the valve is controlled automatically in accordance with operating conditions through the valve mechanism 70.

In the valve 70, the pipe 69 communicates with a passage 74, which is normally closed by a relief valve 75, urged towards its closed position by a pair of springs 76 and 77. The springs 76 and 77, as best seen in Figure 4, are adjustable by means of levers 78 and 79, pivoted on rods 80 and 81, which are rotatable in the valve casing. By adjusting one or both of the levers 78 and 79, the spring loading force on the valve 75 may be varied to vary the pressure at which it will open.

In order to control the spring loading on the valve 75, the rod 80 is connected through a lever 82 and a link 83 with a manually adjustable lever 84, which may be mounted in a convenient place for ready adjustment by the driver of the vehicle. The lever 84 is adapted to move over a fixed segment 85 and may be held in any adjusted position by a suitable detent mechanism cooperating with the segment. By adjusting this lever, the operator may readily change the spring loading on the valve 75 so as to change the speed at which the valve 49 will be moved.

The rod 81 is connected through a similar lever 86 and link 87, with a rocking lever 88 engaged at one end by a cam 89. The cam 89 is connected through a link 90 with a control member 91 for controlling the speed of the engine driving the transmission, such, for example, as the usual accelerator pedal of a vehicle. The cam 89 is shown as circular throughout substantially one-fourth of its periphery, but drops off, and at one end relieves the pressure on the spring 77 when the accelerator pedal is moved to substantially the wide open position.

In operation, the output pressure of the pump 60 will be more or less relieved by the valve 75, so that the piston 57 will not be moved until a relatively higher speed is reached. By adjusting the spring loading on the valve 75 through the lever 84, and through the cam mechanism associated with the accelerator pedal, the speed at which the piston 57 will be shifted can readily be changed, the greater the spring loading on the valve 75, the lower the speed at which the piston will be shifted.

Under certain conditions, it is desirable that shifting of the piston be completely prevented, in order that the sun gear 26 may not be connected to the engine shaft 10. As for example, in reverse, in neutral, and in low gear forward position, it is desired that the pinion 26 shall remain free. In order to obtain this result, there is provided associated with the mechanism for controlling the several brakes 34, 38 and 43 an interlocking mechanism which will operate to prevent the building up of any substantial pressure on the piston 57. As seen in Figure 2, several brakes may be controlled by a shifting lever 92, operating in a slot 93. With the lever 92 in the position shown in the slot, all of the brakes are disengaged and the transmission is in neutral. If the lever is shifted to the left and upwardly, the brake 43 will be engaged to obtain reverse drive. If the lever is shifted to the left and downwardly, the brake 38 will be engaged for low speed forward drive. If the lever 92 is shifted to the right and upwardly, the brake 34 will be engaged for intermediate and high speed forward drives.

The passage 74 in the valve 70 is adapted to communicate with a by-pass 94, connected directly to the return passage 65 under the control of a valve 95. The valve 95 is moved by a lever 96 on a shaft 97, which is connected through a lever 98 and a link 99 with a cam lever 100. The cam lever 100 is normally rocked to the left by a spring 101 to move the valve 95 to the position shown in Figure 2, in which the passages 74 and 94 are in communication. When the shift lever 92 is moved to the right and upwardly into the intermediate and high speed forward position, it will engage and cam the lever 100 to the right, thereby moving the valve 95 to the right to cut off the passage 94. Thus, at this time, and at no other time, the valve 75 becomes effective to resist bleeding of the pump fluid, so that a back pressure can be built up on the piston 57.

Under certain driving conditions, as for example, when driving in extremely hilly country, or for rapid acceleration, it is desirable that the transmission shall be maintained in intermediate speed by preventing shifting of the valve 49. For this purpose, a second slidable valve 102 is arranged in the valve body 70 to control communication between the passage 74 and a bleed passage 103. The valve 102 is controlled through a shaft 104, lever 105, and link 106, by operation of the accelerator pedal. For this purpose, the link 106 is connected to one end of a bell crank lever 107, which is adapted to be swung to one or another of its positions by ears 108 on the cam 89, which is operated by the accelerator pedal. For normal operation, the valve 102 is in the position shown in which it blocks the passage 103. When the accelerator pedal is depressed to its extreme position, and beyond the full open throttle position, the upper ear 108 will engage the bell crank lever and rock it in a direction to shift the valve 102 to the left, thereby opening the vent passage 103. The valve will remain in this position until the accelerator pedal is released and returned to its extreme upper position, at which time the bottom ear 108 will engage the bell crank lever 107 and rock it back to the position shown in Figure 2.

At certain times, as for example, on starting the vehicle in extremely cold weather, the oil pumped by the pump 60 is highly viscous, and tends to shift the piston 57 at a lower speed than is normally desired, due to the fact that the valve 75 will afford a greater restriction to viscous than to thin oil. In order to compensate for this temperature effect, there may be provided according to the invention a second bleed valve 109, in parallel with the valve 75 and connecting the passage 74 to the return pipe 65. The valve 109 is controlled by a temperature responsive element, shown as a sylphon 110, directly connected to the valve 109 and adjustably mounted in the valve casing on an adjusting screw 111. At low temperatures, the sylphon 110 tends to open the valve 109 to compensate for the greater restrictive effect of the valve 75. As the temperature increases, the valve 109 will be closed, leaving the automatic control under the influence of the valve 75.

Instead of providing separate valves, such as 95 and 102, to prevent automatic shifting of the transmission, the functions of the three valves 75, 95 and 102 may, if desired, be combined in a single valve, as shown in Figure 3. In this construction, the bleed valve 75 is normally urged to its closed position by springs 112 and 113, acting against a collar 114, which is slidable on the valve stem. The collar 114 is engaged by a yoke on one end of a lever 115, pivoted on its end and connected intermediate its ends through a lost motion connection 116, to a lever 117. The lever 117 is urged to the left, as seen in Figure 3, by a spring 118, which is more powerful than the combined springs 112 and 113. Thus, the collar 114 is normally urged to the left against the springs 112 and 113 to remove the spring loading on the valve 75, so that it may open freely. When the shift lever 92 is moved in the slot 93 to the upper right hand position, it will engage the lever 117 and cam it to the right against the tension of the spring 118, thereby freeing the lever 115, so that the springs 112 and 113 will press the collar 114 and the valve 75 to the right, tending to seat the valve.

The lever 115 is also adapted to be urged to the left by a cam 119, controlled by a lever 120 and a link 121, which is connected to the bell crank 107 for operation by the ears 108 on the accelerator-operated cam 89. When the cam 120 is rocked counterclockwise about its pivot by complete depression of the accelerator pedal, as described above, it will cam the lever 115 to the left, thereby moving the collar 114 to the left and overcoming the force exerted by the springs 112 and 113. At this time, the valve 75 will be free to open, so that fluid forced out by the pump 60 may be freely returned to the sump without creating a pressure on the piston 57 sufficient to operate it.

When a fluid displacement clutch of the type shown in Figure 1 is employed to connect the engine shaft to the intermediate shaft 22, it will be seen that the clutch can be operated at any time to pick up or release the load smoothly and easily. Thus, a clutch of this type may be operated automatically, whether or not it is under load. However, for certain other types of clutches, as for example, positive tooth clutches, it necessary to remove the load from the clutch teeth before the clutch can be disengaged. For this purpose, the invention provides that the ignition circuit of the driving engine shall temporarily be disabled when it is desired to disengage the clutch. For this purpose, a shunt circuit in parallel with the ignition circuit is provided, including switches 122 and 123, as shown in Figure 2. The switch 122 is normally open and is adapted to be closed by a projection 124 on the accelerator pedal shaft 90 when the accelerator pedal is completely depressed to a position to rock the bell crank 107. The switch 123 is controlled by a piston rod 56, and is adapted to be closed when the piston is moved to the right, to cause engagement of the clutch mechanism, and to be open when the piston moves to the left to cause disengagement of the clutch. Thus, in normal operation in high speed range, the switch 123 is closed. If at this time the accelerator pedal is completely depressed, to close the switch 122, a shunt circuit in parallel with the ignition circuit will be closed, and the ignition circuit will be disabled. The driving torque of the engine is thus immediately interrupted to take the load off the clutch, and as soon as this is done, the piston 57 and the piston rod 56 will move to the left to cause disengagement of the clutch. Upon this operation, the switch 123 will be opened to break the shunt circuit so that the ignition circuit will again be effective, the transmission then being in the intermediate forward position.

Bands 34 may be engaged by a spring and disengaged by a piston and cylinder employing a fluid such as vacuum, and the same cylinder and piston means can be employed to engage band 38 immediately after releasing band 34. Said piston and cylinder means may be controlled by a side movement of the accelerator pedal, as fully set forth in my co-pending application Serial No. 345,877, filed July 17, 1940.

While the invention has been shown and described in detail in connection with one particular embodiment, it will be understood that various changes might be made, and that the embodiment shown in the drawings is not intended as a definition of the scope of the invention, reference being had for this purpose to the appended claims.

What is claimed is:

1. In a transmission shiftable from one driving condition to another, control means comprising a fluid pump driven by the transmission for creating a pressure varying with its speed, a fluid motor connected to the pump to be operated in response to a predetermined pressure to shift the transmission, a relief valve communicating with the pump outlet to control the pressure acting on the motor, a pair of springs urging the relief valve closed, a control member to vary the speed at which the transmission is driven, means operated by the control member to vary the loading of one of said springs, a hand lever movable to vary the loading of the other spring, and means to hold the hand lever in any one of a plurality of selected positions.

2. In a transmission shiftable from one driving condition to another, control means comprising a fluid pump driven by the transmission for creating a pressure varying with its speed, a fluid motor connected to the pump to be operated in response to a predetermined pressure to shift the transmission, a relief valve connecting the pump outlet to the pump inlet to control the pressure acting on the motor, resilient means urging the relief valve closed, means operable at will from a remote point for varying the loading of the resilient means, thereby to vary the speed at which the transmission will be shifted, and means to render the fluid motor inoperative to cause shifting of the transmission.

3. In a transmission shiftable from one driving condition to another, control means comprising a fluid pump driven by the transmission for creating a pressure varying with its speed, a fluid motor connected to the pump to be operated in response to a predetermined pressure to shift the transmission, a relief valve connecting the pump outlet to the pump inlet to control the pressure acting on the motor, resilient means urging the relief valve closed, means operable at will from a remote point for varying the loading of the resilient means, thereby to vary the speed at which the transmission will be shifted, a manually controlled shiftable member to change the transmission from one driving range to another, and means controlled by the manually shiftable member when it is in certain positions to render the fluid motor inoperative to cause shifting of the transmission.

4. In a transmission shiftable from one driving condition to another, control means comprising a fluid pump driven by the transmission for creating a pressure varying with its speed, a fluid motor connected to the pump to be operated in response to a predetermined pressure to shift the transmission, a relief valve connecting the pump outlet to the pump inlet to control the pressure acting on the motor, resilient means urging the relief valve closed, means operable at will from a remote point for varying the loading of the resilient means, thereby to vary the speed at which the transmission will be shifted, a control member to vary the speed at which the transmission is driven, and means operated by the control member in one position thereof to render the fluid motor inoperative to shift the transmission.

5. In a transmission shiftable from one driving condition to another, control means comprising a fluid pump driven by the transmission for creating a pressure varying with its speed, a fluid motor connected to the pump to be operated in response to a predetermined pressure to shift the transmission, a relief valve connecting the pump outlet to the pump inlet to control the pressure acting on the motor, resilient means urging the relief valve closed, a control member to vary the speed at which the transmission is driven, means operable by the control member to vary the loading of the resilient means, thereby to vary the speed at which the motor will shift the transmission, and means operated by the control member in one position to render the motor inoperative to shift the transmission.

6. In a transmission shiftable from one driving condition to another, control means comprising a fluid pump driven by the transmission for creating a pressure varying with its speed, a fluid motor connected to the pump to be operated in response to a predetermined pressure to shift the transmission, a relief valve communicating with the pump outlet to control the pressure acting on the motor, resilient means urging the relief valve closed, and a manually controllable valve in the pump outlet to cut off the relief valve or the motor at will.

7. A transmission for connecting a driving shaft to a driven shaft comprising a fluid torque transmitting device having its driving member connected to the driving shaft, a differential gear set, means connecting the driven member of the hydraulic device to one element of the gear set, means connecting another element of the gear set to the driven shaft, a fluid displacement clutch connecting the driving shaft to a third element of the gear set, and valve means controlling said clutch.

8. A transmission for connecting a driving shaft to a driven shaft comprising a fluid torque transmitting device having its driving member connected to the driving shaft, a differential gear set, means connecting the driven member of the hydraulic device to one element of the gear set, means connecting another element of the gear set to the driven shaft, a clutch connecting the driving shaft to a third element of the gear set, control means for the clutch, and switches operated by the control means temporarily to disable the ignition circuit of an engine driving the driving shaft when the clutch is to be disengaged.

9. A transmission for connecting a driving shaft to a driven shaft comprising a hydraulic torque transmitting device having its driving member connected to the driving shaft, a gear set including three sun gears, two ring gears, a compound planet gear meshing with one of the ring gears and one of the sun gears, idler gears meshing with the planet gear and the other two sun gears, one of the idler gears also meshing with the other ring gear, a carrier for the planet gears connected to the driven shaft, means connecting said one of the sun gears to the driven member of the hydraulic device, brake means for the ring gears so that when said one ring gear is braked the driven shaft will be driven forward at reduced speed through the hydraulic device and gear set, and when the other ring gear is braked the driven shaft will be turned backwards at reduced speed through the hydraulic device and gear set, one-way brake means holding one of the other sun gears against reverse rotation to provide a reaction member for higher speed forward drive, a clutch connecting the driving shaft to the third sun gear to provide a two path drive through the hydraulic device and gear set, and means operated in response to operating conditions of the transmission to control the clutch.

10. In a transmission shiftable to a plurality of forward driving conditions and a reverse driving condition, a selector lever to select either forward or reverse drive, a fluid pump driven by one element of the transmission, a fluid motor connected to the pump to be operated in response to pump pressure to shift the transmission, a relief valve communicating with the pump outlet to control the pressure acting on the motor, a spring urging the relief valve closed, a control member to vary the speed at which the transmission is driven, a connection between the control member and the spring to vary the load on the spring in accordance with the position of the control member, a pair of by-pass valves in the pump outlet, a connection from the selector lever to one of the by-pass valves to open it when the lever is in reverse position, and a connection from the control member to the other by-pass valve to open it when the control member is in certain positions.

11. In a transmission shiftable to a plurality of forward driving conditions and a reverse driving condition, a selector lever to select either forward or reverse drive, a fluid pump driven by one element of the transmission, a fluid motor connected to the pump to be operated in response to pump pressure to shift the transmission, a relief valve communicating with the pump outlet to control the pressure acting on the motor, a pair of springs urging the relief valve closed, a control member to vary the speed at which the transmission is driven, a connection between the control member and the spring to vary the load on the spring in accordance with the position of the control member, manual means to vary the load on the other spring, a pair of by-pass valves in the pump outlet, a connection from the selector lever to one of the by-pass valves to open it when the lever is in reverse position, and a connection from the control member to the other by-pass valve to open it when the control member is in certain positions.

12. In a transmission shiftable from one driving condition to another, a selective manual and automatic control comprising a fluid pump driven by one element of the transmission, a fluid motor connected to the transmission to shift it, a pressure responsive relief valve, and a manually controllable three position valve which in one position connects the pump directly to the motor, in a second position vents the pump, and in a third position connects the pump to both the motor and the relief valve.

13. A transmission for connecting a driving shaft to a driven shaft comprising a gear set including three sun gears, two ring gears, a compound planet gear meshing with one of the sun gears and one of the ring gears, idler gears connecting the planet gear to the other two sun gears and the other ring gear, a carrier for the planet gears connected to the driven shaft, means drivably connecting said one of the sun gears to the driving shaft, brake means for the ring gears so that when said one ring gear is braked the driven shaft will be driven forward at reduced speed and when said other ring gear is braked the driven shaft will be driven in reverse, a one-way brake holding one of the other sun gears against reverse rotation to provide a reaction member for higher speed forward drive, and a clutch connecting the third sun gear to the driving shaft to provide for maximum forward speed.

14. A transmission for connecting a driving shaft to a driven shaft comprising a compound differential gear set including a compound planetary gear, a gear carrier for the planetary gear connected to the driven shaft, a plurality of gear elements drivably connected to the planet gear, means drivably connecting one of the gear elements to the driving shaft, brake means for selectively holding two other of said gear elements against rotation to provide reduced speed forward and reverse drive respectively, a one-way brake holding another of the gear elements against reverse rotation to provide higher speed forward drive, and a clutch to connect the driving shaft to still another of the gear elements to provide maximum forward speed.

15. A transmission for connecting a driving shaft to a driven shaft comprising a compound differential gear set including a compound planetary gear, a gear carrier for the planetary gear connected to the driven shaft, a plurality of gear elements drivably connected to the planet gear, means drivably connecting one of the gear elements to the driving shaft, a one-way brake holding another of the gear elements against reverse rotation to provide a reaction member for torque-multiplying forward drive, a fluid displacement clutch connecting the driving shaft to still another of the gear elements to provide maximum speed forward drive, and valve means controlling the clutch.

ADIEL Y. DODGE.